United States Patent
Wilkinson et al.

(10) Patent No.: US 7,425,078 B2
(45) Date of Patent: Sep. 16, 2008

(54) ROTATING LED BEACON

(75) Inventors: Dean A. Wilkinson, Boise, ID (US); Earl E. Esson, Meridian, ID (US)

(73) Assignee: Electronic Controls Company, Boise, ID (US)

( * ) Notice: Subject to any disclaimer, the term of this patent is extended or adjusted under 35 U.S.C. 154(b) by 0 days.

(21) Appl. No.: 11/682,713

(22) Filed: Mar. 6, 2007

(65) Prior Publication Data

US 2007/0263376 A1    Nov. 15, 2007

Related U.S. Application Data

(60) Provisional application No. 60/780,457, filed on Mar. 7, 2006.

(51) Int. Cl.
*F21V 21/30* (2006.01)
(52) U.S. Cl. .................. 362/35; 362/800; 362/812; 362/240; 362/244; 340/815.65; 340/815.45; 340/473; 340/908.1; 340/985
(58) Field of Classification Search ............ None
See application file for complete search history.

(56) References Cited

U.S. PATENT DOCUMENTS

| | | | | |
|---|---|---|---|---|
| 5,422,623 A | * | 6/1995 | Bader et al. | 340/331 |
| 6,183,100 B1 | * | 2/2001 | Suckow et al. | 362/35 |
| 6,461,008 B1 | * | 10/2002 | Pederson | 362/35 |
| 6,483,439 B1 | * | 11/2002 | Vukosic | 340/815.65 |
| 6,705,745 B1 | * | 3/2004 | Pederson | 362/284 |
| 6,905,228 B1 | * | 6/2005 | Takeyasu et al. | 362/249 |
| 2002/0114161 A1 | | 8/2002 | Barnett | |

FOREIGN PATENT DOCUMENTS

DE    20311169 U1    10/2003

* cited by examiner

*Primary Examiner*—Sandra O'Shea
*Assistant Examiner*—Danielle Dunn
(74) *Attorney, Agent, or Firm*—Townsend and Townsend and Crew LLP; Kenneth R. Allen

(57) ABSTRACT

A rotating beacon including a plurality of light emitting diodes and a plurality of reflectors is disclosed. The light emitting diodes are attached to one or more printed circuit boards mounted on a base. The reflectors gather light from the light emitting diodes into a plurality of beams which are directed away from the base. A motor and shaft assembly rotates a mirror element. The mirror element is arranged to reflect the beams into a horizontal plane of the rotating beacon.

9 Claims, 8 Drawing Sheets

US 7,425,078 B2

ROTATING LED BEACON

CROSS-REFERENCES TO RELATED APPLICATIONS

The present application claims benefit under 35 USC 119 (e) of U.S. Provisional Application No. 60/780,457, filed on Mar. 7, 2006, entitled "Rotating LED Beacon" the content of which is incorporated herein by reference.

BACKGROUND OF THE INVENTION

Warning beacons play an important role in promoting safety and creating a safe working environment. Police and fire departments, airports, mining operations, and construction companies all use warning beacons to improve the safety of their activities. In each instance, warning beacons are expected to perform reliably even under the most difficult conditions.

A variety of industry standards have created benchmarks for warning beacon performance and reliability. Although some conventional products have achieved compliance with existing standards, there is always a demand for warning beacons that perform better and that operate more reliably. Accordingly, the present invention provides a warning beacon with both enhanced performance and improved reliability,

BRIEF SUMMARY OF THE INVENTION

In accordance with one embodiment of the present invention, a rotating beacon is disclosed. The rotating beacon includes a housing having a base. A motor and shaft assembly is mounted to the base of the rotating beacon. Light emitting diodes are attached to one or more printed circuit boards disposed about the shaft of the motor and shaft assembly. The rotating beacon also includes a plurality of reflectors, each reflector defining a space in relation to one or more of the plurality of light emitting diodes. The reflectors gather light on all sides of the one or more light emitting diodes to form a substantially conical beam and direct it away from the base. A mirror coupled to the shaft of the motor and shaft assembly is arranged to reflect the beams of light into a horizontal plane of the rotating beacon.

In some embodiments, the rotating beacon includes side-emitting diodes. The printed circuit board may have a plurality of openings for receiving one or more of the plurality of light emitting diodes. The base may include cooling surfaces and cooling regions. In a specific embodiment, the printed circuit board is mounted to the base and light emitting diodes are secured within the openings of the printed circuit board and thermally coupled to the cooling surfaces of the base with a heat conducting compound. The reflectors may be parabolic reflectors. In some embodiments, each reflector has an angular portion as well as a parabolic portion.

In additional embodiments, the motor and shaft assembly may include a stepper motor. Circuitry may be provided on the printed circuit board for controlling a rotational speed of the stepper motor. The shaft of the motor and shaft assembly may have a beveled D-cut surface feature. The mirror may engage the shaft at the D-cut surface feature such that a backlash is created when the motor is started. In some embodiments, the mirror is attached to the shaft at approximately a 45° angle and has a substantially elliptical shape.

BRIEF DESCRIPTION OF THE DRAWINGS

FIG. 4A is a top perspective view of the reflector assembly; FIG. 4B is a bottom perspective view of the reflector assembly; and FIG. 4C is a cross-sectional view of the reflector assembly.

FIG. 6A is a top perspective view of the base assembly; and FIG. 6B is a bottom perspective view of the base assembly.

DETAILED DESCRIPTION OF THE INVENTION

In accordance with the present invention, a rotating beacon including a plurality of light emitting diodes and a plurality of reflectors is disclosed. The light emitting diodes are attached to one or more printed circuit boards mounted on a base. The reflectors gather light from the light emitting diodes into a plurality of beams which are directed away from the base. Optionally, the reflectors are parabolic reflectors, the beams of light have a substantially conical shape, and the light emitting diodes are thermally coupled with cooling surfaces of the base. A motor and shaft assembly rotates a mirror element. The mirror element is arranged to reflect the beams into a horizontal plane of the rotating beacon.

Figure 1:
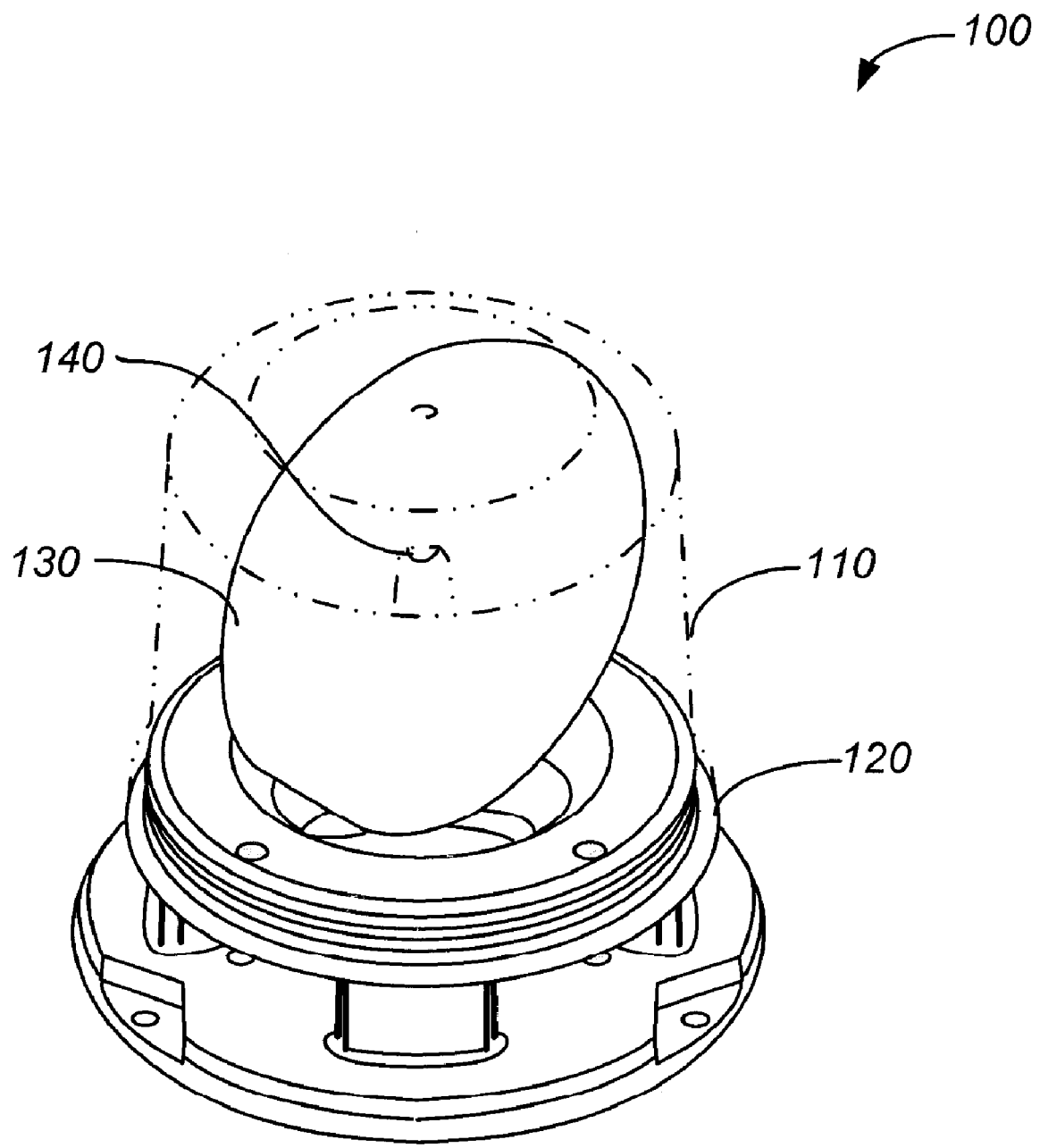
FIG. 1 is a side perspective view of a rotating beacon in accordance with an embodiment of the present invention.

FIG. 1 is a perspective view of a rotating beacon 100 in accordance with an embodiment of the present invention. As shown, beacon 100 includes a housing having a protective cover 110 and a base 120. Within the housing, a mirror element 130 is coupled with a shaft 140 which is rotated by a motor (not shown). Mirror element 130 reflects light from base 120 horizontally outward creating a beam that travels in a 360° path around the beacon. From the perspective of a stationary observer, the beam appears as a flash of light having a predetermined frequency and duration.

Protective cover 110 may be colored or transparent and may be formed from polycarbonate plastic or other impact resistant material. Colors may include amber, blue, green, and red. In some embodiments, one end of protective cover 110 is threaded and joins with base 120 to form a tight seal. The seal prevents dust or debris from entering into the housing making it suitable for use in a variety of operating environments. Protective cover 110 may also attach to base 120 by other means such as mechanical fasteners or chemical bonding agents.

Mirror element 130 engages with shaft 140 at an angle. The angle is selected so that light from base 120 is reflected horizontally outward from beacon 100. In an exemplary embodiment, mirror element 130 makes an angle of approximately 45° with shaft 140. Other angular configurations, however, are possible and may be determined according to the angle at which light is received from base 120. As shown, mirror element 130 has a substantially elliptical shape and is adapted for rotation within the housing. Other shapes, however, such as circular and rectangular may also be used with the present invention. In an exemplary embodiment, mirror element 130 is formed from a lightweight plastic material having a highly reflective surface coat. A surface coat reflectivity of at least 80% is preferred but other reflectivities may be used.

When beacon 100 is activated, shaft 140 rotates at a predetermined rate. The rate of rotation determines, among other things, the flash rate and flash duration of the beacon. In some embodiments, the rotation rate is set based upon an industrial classification of the beacon or to achieve compliance with governmental regulations. For example, shaft rotation may be set to produce a flash rate of 60-240 flashes per minute. The rotation speed may also be configurable by an operator. In an exemplary embodiment, shaft 140 rotates at 90 or 120 revolutions per minute.

Figure 2:
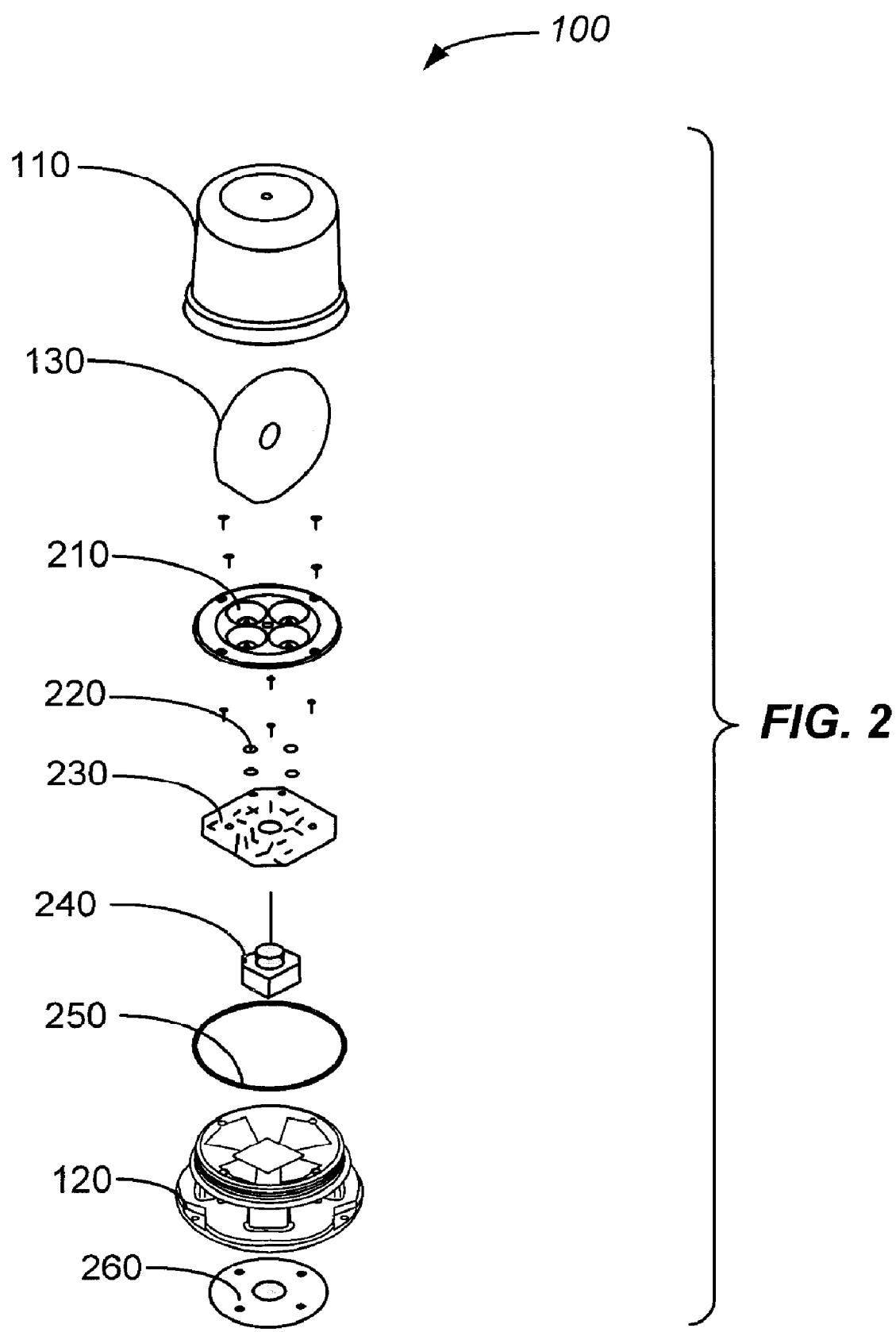
FIG. 2 is an exploded view of a rotating beacon according to one embodiment of the present invention.

FIG. 2 is an exploded view of a rotating beacon 100 according to one embodiment of the present invention. The embodiment shown may include the rotating beacon of FIG. 1 and therefore the description of similar elements is not repeated. Rotating beacon 100 includes, among other elements, reflectors 210, light emitting diodes 220, and printed circuit board 230. Reflectors 210 gathers light from light emitting diodes 220 into beams which are directed away from base 120. Mirror element 130 reflects the beams of light outwards into a horizontal plane as previously discussed. Printed circuit board 230 is disposed beneath reflectors 210 and provides support and electrical power to light emitting diodes 220.

Figure 4A:
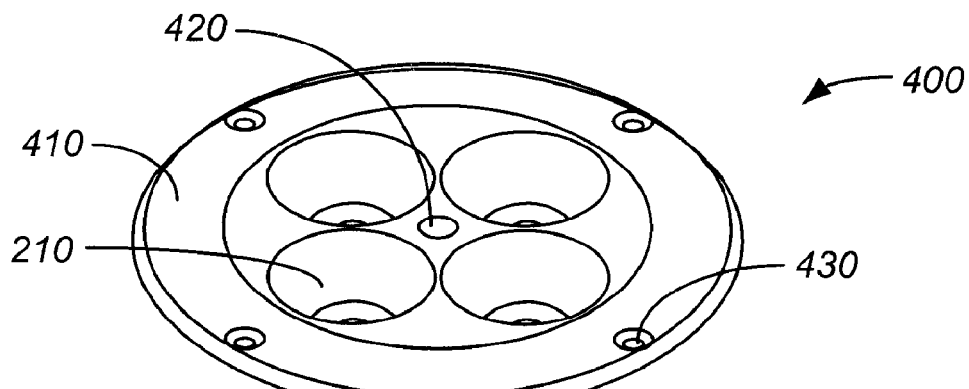
FIGS. 4A-4C are diagrams of a reflector assembly according to one embodiment of the present invention.
Figure 4B:
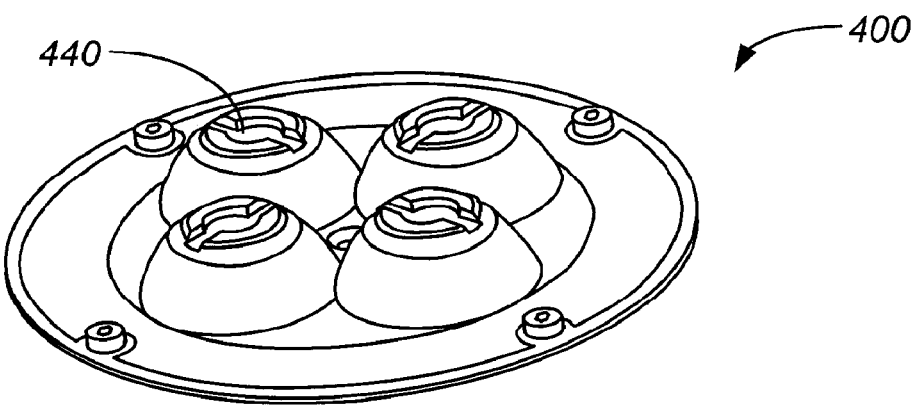
Figure 4C:
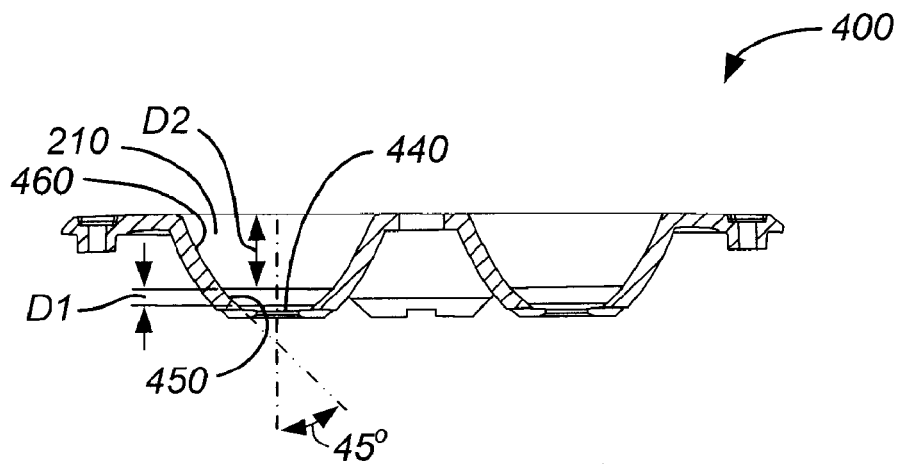

As shown, four reflectors 210 are disposed on a mounting surface which is attached to base 120 with fasteners. Alternatively, more or fewer than four reflectors 210 may be used. A reflector assembly as shown may be injection molded or otherwise fashioned from a single piece of material. Reflectors 210 may also be formed from different pieces of material and separately attached either to a mounting plate or directly to the base. In some embodiments, beacon 100 may be reconfigured by adding or removing individual reflectors 210 from the mounting plate. For example, reflectors 210 may be adjusted based upon the number of light emitting diodes required for operating beacon 100. An exemplary reflector assembly is shown in FIGS. 4A-4C.

Generally speaking, reflectors 210 have parabolic surfaces and gather light from light emitting diodes 220 into beams. In some embodiments, an opening may be formed at the base of each reflector 210 permitting it to be positioned above and around one or more of the light emitting diodes 220. In this arrangement, the reflector surrounds the light emitting diode (or diodes) on all sides and directs light away from base 120 in a substantially conical beam. Reflectors 210 may be metal or formed from a polycarbonate or other plastic material that has been be coated with a reflective surface. In some embodiments, reflectors 210 may be thermally coupled to light emitting diodes 220 and/or to base 120 thereby providing additional surface area and conduction paths for dissipating heat.

The shape of reflectors 210 may be adjusted to achieve specified performance characteristics. In some embodiments, the shape is adjusted to control the amount by which the beams of light diverge from a line normal to the reflector 210 and/or base assembly. In one embodiment, the parabolic surfaces of reflectors 210 are formed so that light is reflected at an angle that is within approximately ±7° from a line normal to the reflector. In other words, the reflectors 210 may be configured to produce substantially conical beams of light and to control the spread or divergence of the beams. Other such adjustments and modifications are possible. For example, light emitting diodes 220 may be positioned at the focal point of each reflector 210 to provide a relatively narrow beam of light. Alternatively, the light emitting diodes may be elevated within the reflectors 210 to achieve a desired beam spread. Diffusers with textured surfaces may be placed on top of the reflectors to further control beam spread.

Figure 5:
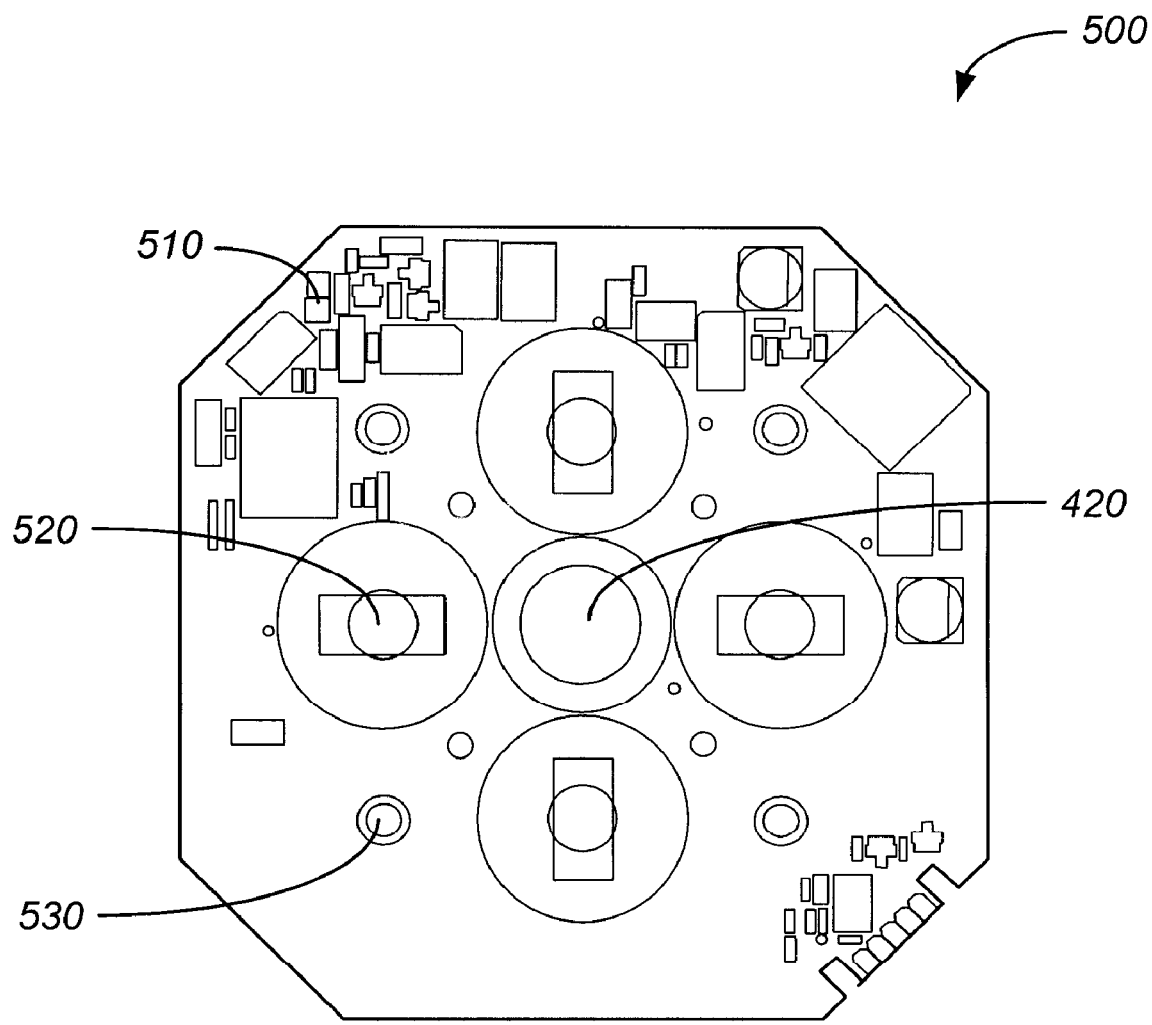
FIGS. 5 is a diagram of a printed circuit board in accordance with an embodiment of the present invention.

Rotating beacon 100 also includes a plurality of light emitting diodes 220. Light emitting diodes 220 may emit light in either a Lambertian or side-emitting pattern and may optionally include lenses. A variety of colors such as red, blue, green, and amber may be used having brightness levels, for example, as prescribed by the Society of Automotive Engineers in Publication SAE J845 titled "Optical Warning Devices for Authorized Emergency, Maintenance, and Service Vehicles." In one embodiment, light emitting diodes 220 are high-powered, side-emitting, lensless LEDs with integrated heat transfer elements ("heat slugs"). Surface-mounted LEDs may also be used. In an exemplary embodiment, light emitting diodes 220 are Lumileds™ from Philips Lumileds Lighting Company headquartered in San Jose, Calif., Printed circuit board 230 supplies electrical power to light emitting diodes 220 and includes control circuitry for operating motor 240. Printed circuit board 230 may include one or more individual circuit boards mounted to base 120. The circuit boards may also provide support to the light emitting diodes. In one embodiment, printed circuit board 230 includes through-holes and individual light emitting diodes are mounted in the through-holes to provide a heat conduction path to base 120. Alternatively, printed circuit board 230 may include a plurality of copper pads and thermal vias to support heat dissipation from surface-mount LED components. An exemplary printed circuit board is shown in FIG. 5.

Motor 240 and shaft 140 form a motor and shaft assembly. Mirror element 130 engages with shaft 140 and is rotated under the influence of motor 240. Motor 240 may include a variety of DC motors and is typically controlled by circuitry on printed circuit board 230. In one embodiment, motor 240 is a stepper motor. Use of a stepper motor permits precise control of shaft 140 and eliminates brushes which can wear out and reduce beacon reliability. Stepper motors used with the present invention may include both unipolar and bipolar devices.

Rotating beacon 100 also includes O-ring 250 and flange 260. O-ring 250 creates a seal between protective cover 110 and base 120 to ensure that dust and debris do not enter the housing. In some embodiments, O-ring 250 is made of a rubber or silicone based material and creates a water resistant seal. Flange 260 adapts beacon 100 for mounting on a vehicle or other object. As shown, flange 260 is configured for a pipe-mount connection. However, in some embodiments, flange 260 supports magnetic mounting or other surface mount options.

Figure 3:
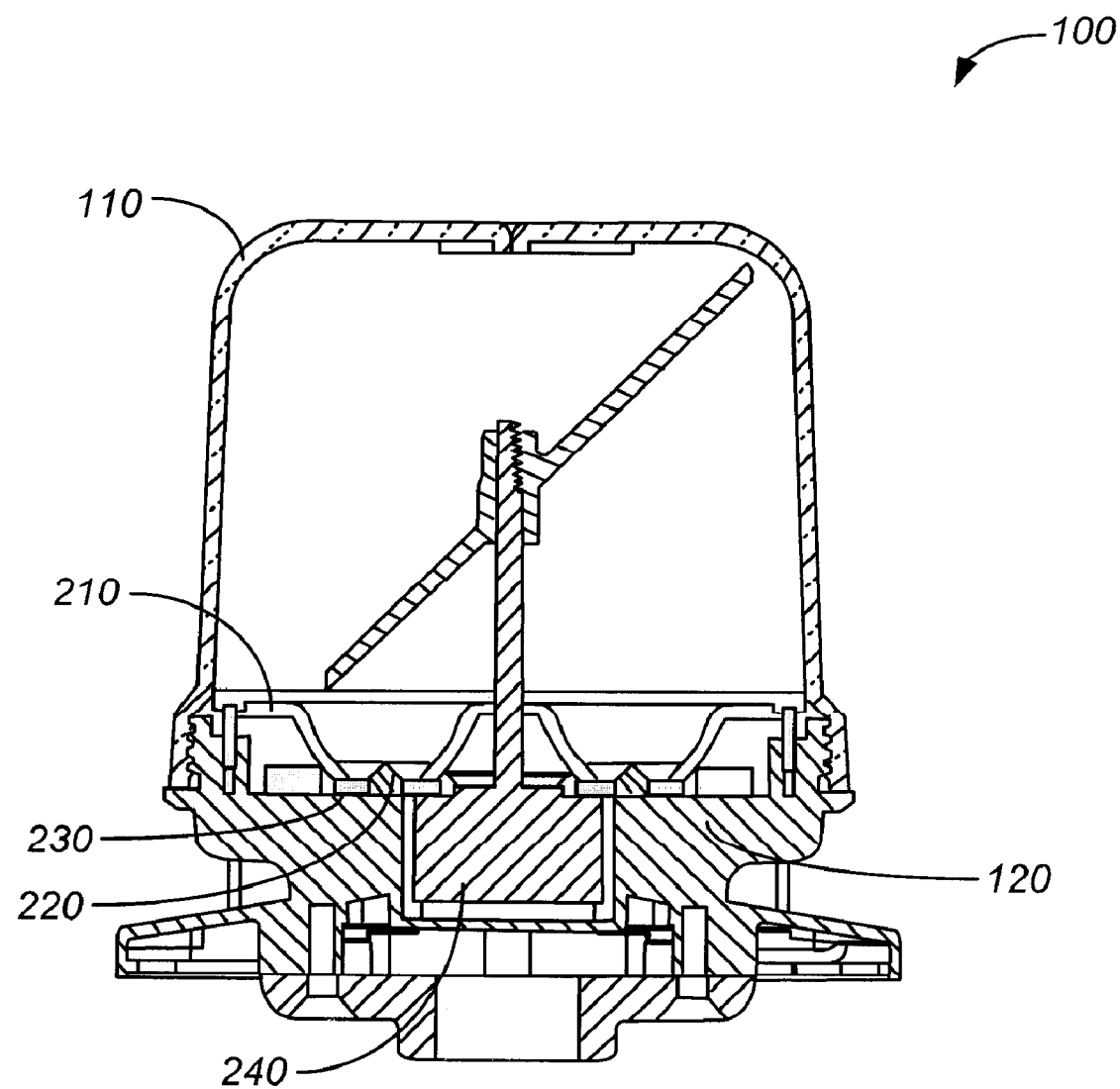
FIG. 3 is a side cross-sectional view of a rotating beacon according to an embodiment of the present invention.

FIG. 3 is a cross-sectional view of a rotating beacon 100 according to one embodiment of the present invention. This embodiment may include the rotating beacons of FIG. 1 and FIG. 2. As shown, reflector 210 is positioned above and around light emitting diode 220 and directs light away from base 120 in a cone-shaped beam. Light emitting diode 220 passes through an opening in printed circuit board 230 and makes contact with base 120. In one specific embodiment, light emitting diode 220 is thermally coupled to base 120 with a conductive adhesive or thermal grease compound. The thermal coupling between light emitting diode 220 and base 120 creates a shortened path for heat transfer to the outside environment. This heat transfer mechanism increases the longevity of light emitting diode 220 and reduces variation in light output due to operating temperature.

FIGS. 4A-4C show details of a reflector assembly 400 according to one embodiment of the present invention. FIG. 4A is a top perspective view of reflector assembly 400 showing mounting surface 410, reflectors 210, shaft opening 420, and mounting holes 430. Mounting surface 410 is attached to base 120 such that it rests on or slightly above printed circuit board 230. FIG. 4B is bottom perspective view of reflector assembly 400 showing openings 440 in reflectors 220. Mounting surface 410 is aligned with printed circuit board 230 so that each light emitting diode 220 enters a reflector 220 through an opening 440.

FIG. 4C is a side cross-sectional view of reflector assembly 400 illustrating additional reflector 210 details. As shown, reflector 210 comprises two regions. A first angular region 450 extends at approximately a 45° angle from the base of the reflector to a height D1. A second parabolic region 460 joins with the first angular region 450 and continues to a height D2 such that D1+D2 represents the interior height of reflector 210. First angular region 450 improves the efficiency of reflector 210 by collecting lateral emissions near the base of light emitting diodes 220 and is particularly well-suited for use with side emitting components. Second parabolic region forms a beam of light and is fashioned so that divergence of the beam from a line normal to the reflector is maintained with predetermined limits.

FIG. 5 is a diagram of a printed circuit board 500 according to one embodiment of the present invention. Printed circuit board 500 includes circuitry 510 for providing a regulated current flow to light emitting diodes 220 and also for controlling the operation of motor 240. When a stepper motor is used, for example, circuitry 510 may further include a programmable microcontroller for controlling its operation. A programmable microcontroller may set rotational speed of shaft 140 and other operating parameters. In one embodiment, the programmable microcontroller stores a startup sequence used to control the acceleration of shaft 140 when the beacon is first activated or recovers from a stalled condition.

As shown, printed circuit board 500 also includes cut-out regions 520. Light emitting diodes 220 are arranged on printed circuit board 500 such that a portion of each diode passes through a cut-out region 520 and couples with the base assembly. The base assembly may be made of aluminum or other metals having suitable thermal transfer characteristics. As shown, printed circuit board 500 includes four cut-out regions 520 and is configured to receive four light emitting diodes. However, it will be readily understood that more or fewer than four cut-out regions 520 are possible and that different arrangements of light emitting diodes may be used. For example, several light emitting diodes may be disposed within a single cut-out region 520. Alternatively, in some embodiments, cut-out regions 520 are replaced with copper pads to support surface-mounted LEDs. A series of thermal vias may also be added in and around the copper pads to provide shortened paths for conducting heat to the base assembly.

Figure 6A:
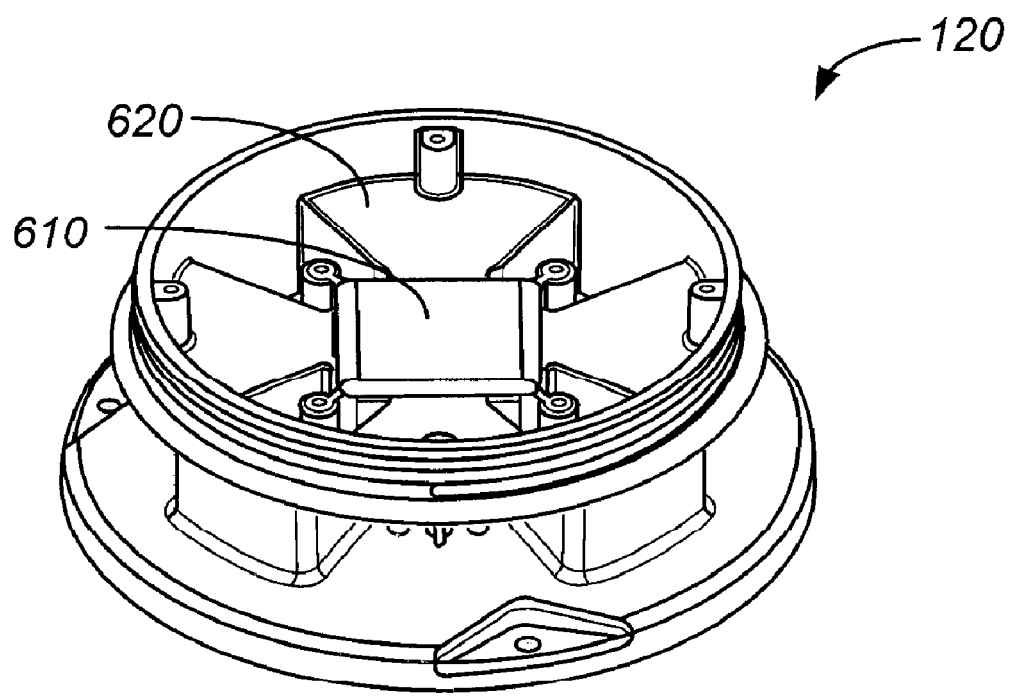
FIGS. 6A-6B are diagrams of a base assembly according to one embodiment of the present invention.
Figure 6B:
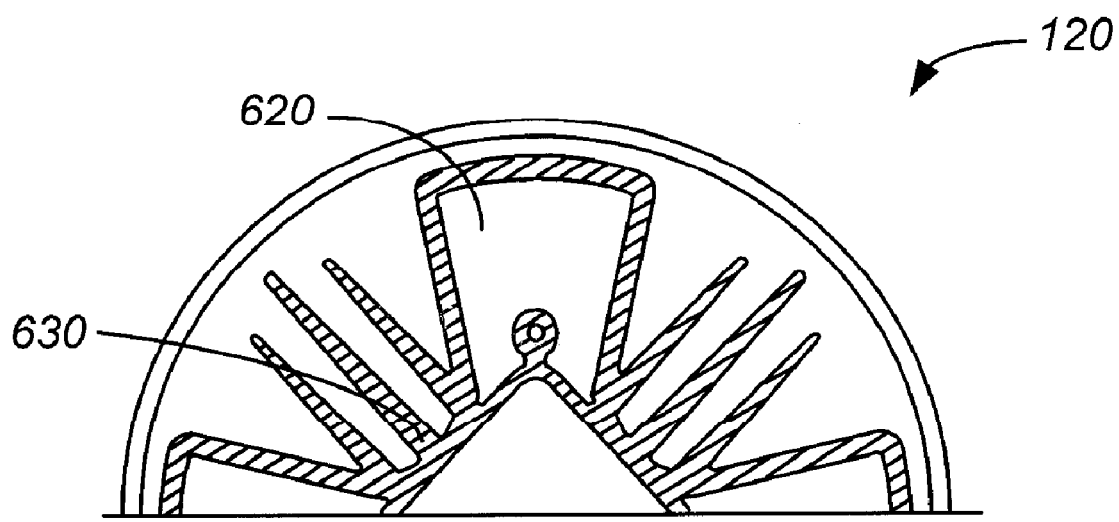

FIGS. 6A-6B are diagrams of a base assembly according to an embodiment of the present invention. FIG. 6A is a top perspective view of base assembly 120. As shown, the interior space surrounding motor compartment 610 is divided into several cooling regions 620. Referring to FIG. 6B, it can be seen that base assembly 120 also includes a plurality of cooling surfaces 630. Cooling surfaces 630 provide additional surface area for conducting heat from base assembly 120 to the environment. In some embodiments, printed circuit board 500 is mounted to base assembly 120 so that light emitting diodes 220 are positioned above cooling surfaces 620 and can be thermally coupled therewith. This shortens the path from the individual light emitting diode to the outside air and significantly improves heat transfer characteristics of rotating beacon 100.

Figure 7:
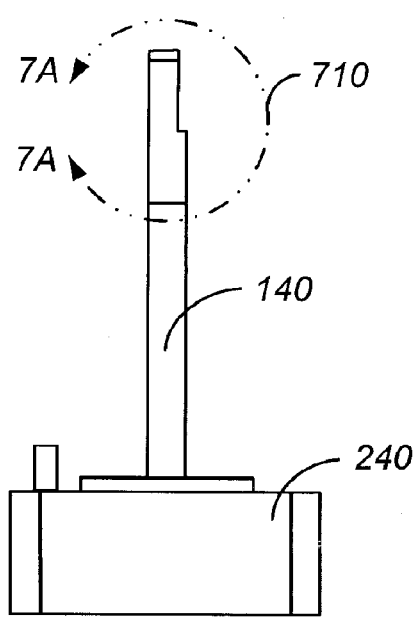
FIG. 7 is a side view of a motor and shaft assembly in accordance with an embodiment of the present invention.
Figure 7A:
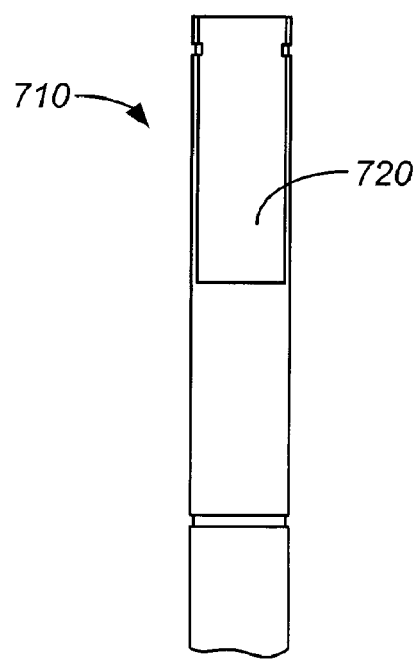

FIG. 7 is a side view of a motor and shaft assembly in accordance with an embodiment of the present invention. As shown in FIG. 7A, shaft 140 includes a D-cut surface feature 720 at the end 710 where it engages with mirror element 130. The face of the D-cut surface feature may be slightly beveled. For example, a bevel angle of less than 3° may be used. In some embodiments, the bevel angle may be approximately 1-2°.

Figure 8:
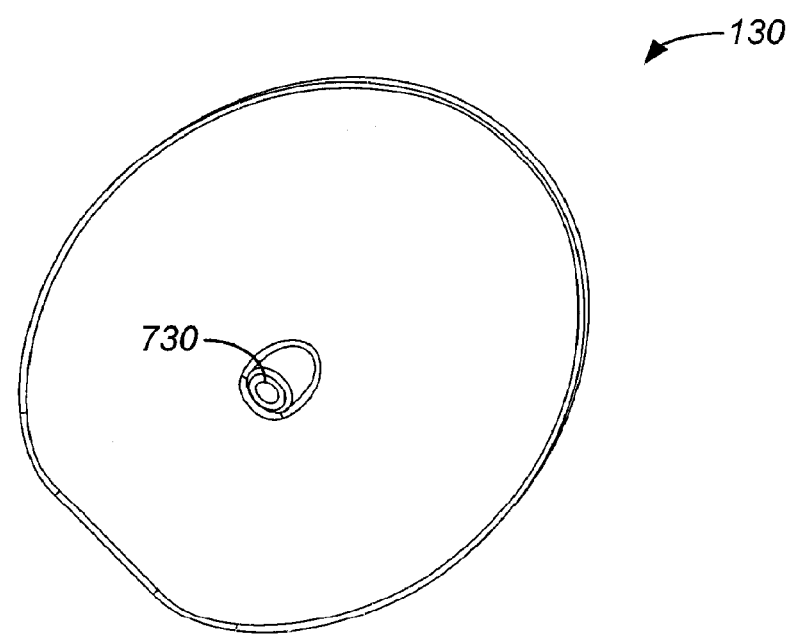
FIG. 8 is a perspective view of a mirror element according to one embodiment of the present invention.

With reference to FIGS. 7-8, it can be seen that mirror element 130 fits over shaft 140 and engages with the D-cut surface feature. In some embodiments, the interior diameter of mating surface 730 includes a predetermined amount of additional clearance. When motor 240 is activated, a small amount of backlash develops as shaft 140 engages with mirror element 130. The amount of backlash is controlled by the amount of clearance provided and also by the amount of bevel of the D-cut surface feature. This arrangement reduces the amount of torque required to restart the beacon if, for example, the motor is stalled or otherwise interrupted and improves reliability by avoiding the need for operator intervention in such circumstances.

Figure 9:
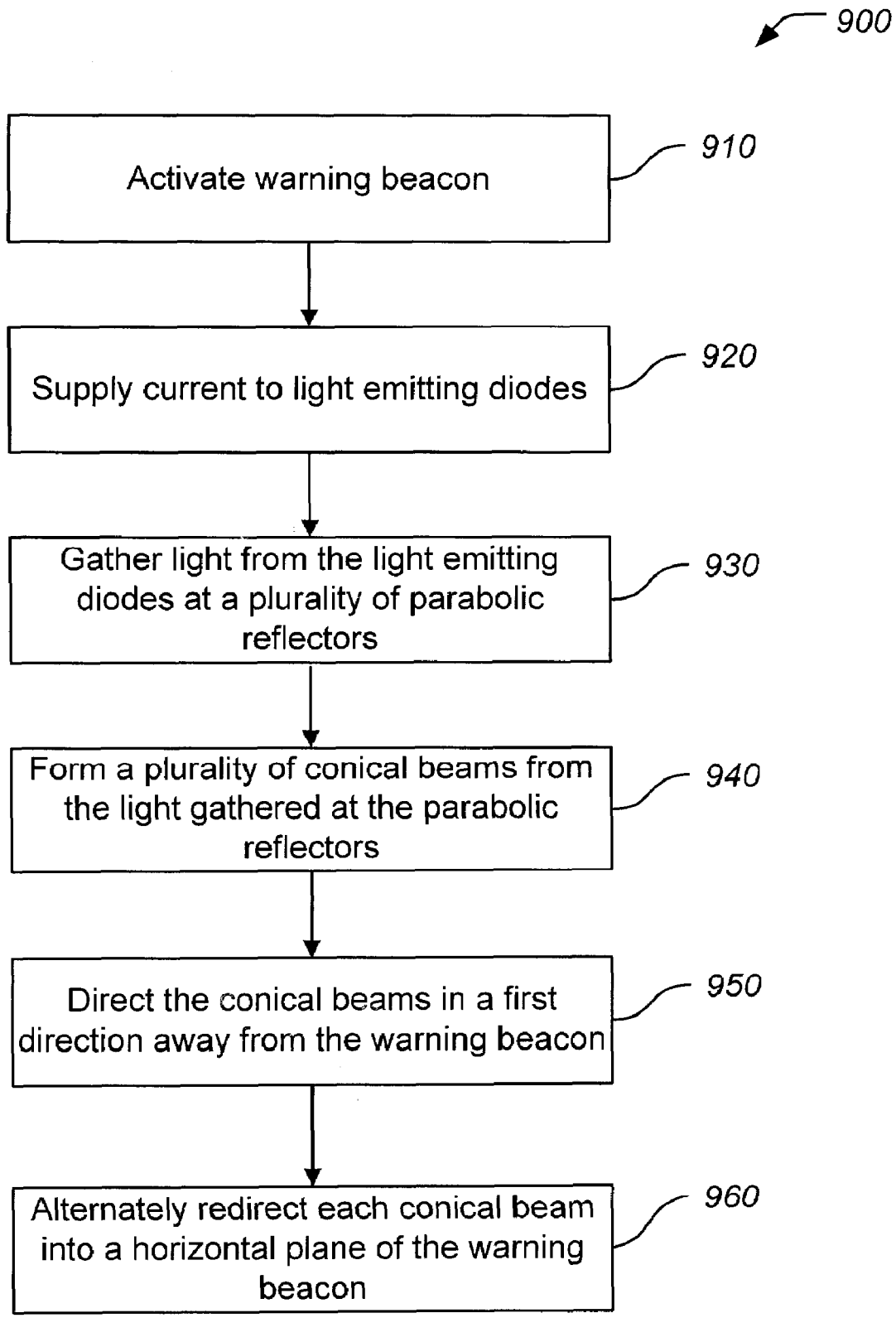
FIG. 9 is a flowchart depicting a method of operating a warning beacon according to one embodiment of the present invention.

FIG. 9 is a flowchart 900 depicting a method of operating a warning beacon according to one embodiment of the present invention. At step 910, the rotating beacon is activated. Activating the beacon controls current flow to a plurality of light emitting diodes as indicated at step 920. In one embodiment, the light emitting diodes are high powered, side-emitters such as those in the Luxeon™ family from the Philips Lumiled Corporation. These light emitting diodes produce more light and consume less power than conventional devices. The light emitting diodes may be disposed in different quadrants on a surface of the warning beacon to provide a collection of evenly distributed light sources or they may be arranged at the vertices of a polygon.

At step 930, light is gathered from the light emitting diodes by a plurality of parabolic reflectors. The parabolic reflectors form a plurality of conical beams from the light supplied by the light emitting diodes in step 940. For example, each parabolic reflector may gather light from one or more of the light emitting diodes into a separate beam. At step 950, the conical beams are directed in a first direction away from the warning beacon. Lastly, at step 960, each beam is redirected in an alternating fashion into a horizontal plane of the warning beacon. In some embodiments, light is redirected according to a predetermined sequence to create a rotating beam that travels in a 360° path around the warning beacon.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A rotating beacon comprising:
   a housing having a base;
   a stepper motor and shaft assembly mounted to the base;
   a plurality of side-emitting light emitting diodes attached to one or more printed circuit boards disposed about the shaft of the motor and shaft assembly;
   a plurality of reflectors, each reflector defining a space in relation to one or more of the plurality of light emitting diodes in which light on all sides of the one or more light emitting diodes is gathered into a substantially conical beam and directed away from the base; and a mirror element operatively arranged to reflect beams of light from the plurality of reflectors into a horizontal plane of the rotating beacon, the mirror element engaging the shaft of the stepper motor only upon the stepper motor having achieved sufficient torque to sustain rotation of the shaft under load.

2. The rotating beacon of claim 1 wherein the base further comprises a plurality of cooling surfaces and a plurality of cooling regions, and wherein the light emitting diodes are bonded to the cooling surfaces.

3. The rotating beacon of claim 1 wherein each of the plurality of reflectors comprises a first straight conical portion around the center of the reflector and a second paraboloid portion contiguously around the straight conical region, the first portion disposed to gather and reflect primarily lateral light emissions from a single side-emitting light emitting diode and the second portion being disposed to gather and reflect other than the lateral emissions from the single side-emitting light emitting diode.

4. The rotating beacon of claim 1 wherein the shaft of the stepper motor and shaft assembly has a D-cut surface feature where the shaft joins the mirror element, the D-cut surface feature having sufficient clearance that the mirror element does not engage the shaft at rest such that backlash is evident when the motor is started.

5. The rotating beacon of claim 1 wherein the mirror element is disposed with respect to the axis of the shaft of the stepper motor and shaft assembly at an angle of approximately 45 degrees.

6. The rotating beacon of claim 5 wherein the mirror element has a substantially elliptical shape.

7. A method of operating a warning beacon comprising:

gathering light from a plurality of side-emitting light emitting diodes disposed within a plurality of parabolic reflectors each having a straight conical section around the center of the reflector to gather primarily side-emitted light and a paraboloid section surrounding the conical section to gather other than the side-emitted light;

forming a plurality of conical beams from the light gathered by the parabolic reflectors; directing each of the plurality of conical beams in a first direction; and redirecting the conical beams into a horizontal plane of the warning beacon to create a continuously rotating beam in a horizontal arc about the warning beacon; and having the mirror element engaging the shaft of the stepper motor only upon the stepper motor having achieved sufficient torque to sustain rotation of the shaft under load.

8. The method of claim 7 further comprising:

controlling a heat flow from the plurality of light emitting diodes to the base to maintain a temperature of the light emitting diodes.

9. The method of claim 7 wherein redirecting further comprises:

rotating a reflective surface into a path of the conical beams.

* * * * *